(No Model.)

P. J. HELLER.
POTATO DIGGER.

No. 359,606. Patented Mar. 22, 1887.

Attest:
A. N. Jesbera
J. Reinhardt

Inventor:
Peter J. Heller
By David Axsun
Att'y.

UNITED STATES PATENT OFFICE.

PETER J. HELLER, OF MONTCLAIR, NEW JERSEY.

POTATO-DIGGER.

SPECIFICATION forming part of Letters Patent No. 359,606, dated March 22, 1887.

Application filed November 20, 1886. Serial No. 219,464. (No model.)

*To all whom it may concern:*

Be it known that I, PETER J. HELLER, of Montclair, in the county of Essex and State of New Jersey, have invented certain new and useful Improvements in Potato-Diggers; and I do hereby declare that the following is a full and exact description thereof, reference being had to the accompanyng drawings, and to the letters of reference marked thereon, making a part of this specification, in which—

Figure 1:
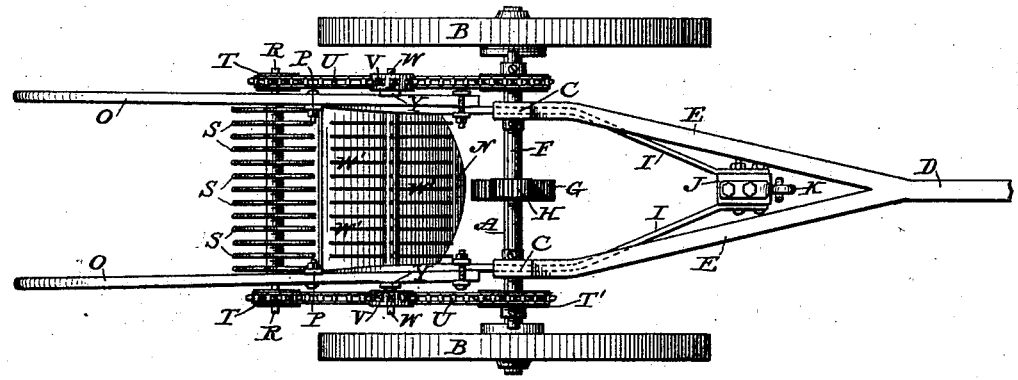
Figure 2:
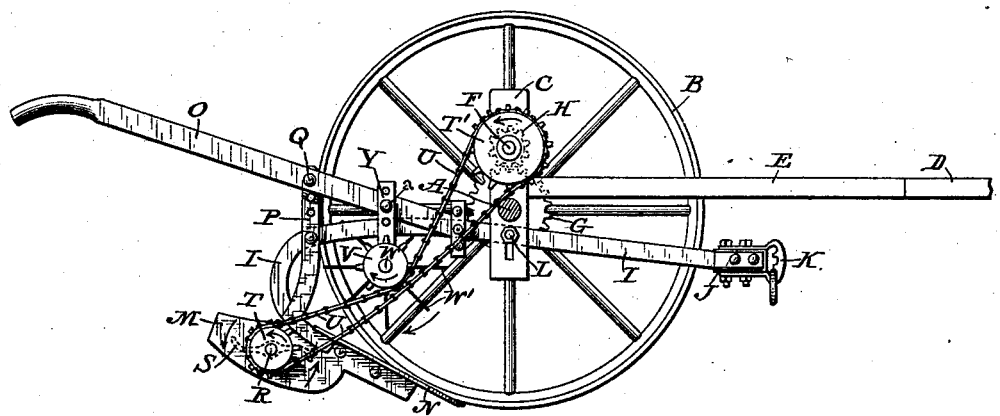
Figure 3:
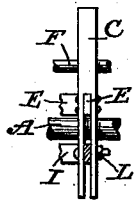

Figure 1 is a plan view of my improved potato-digging machine; Fig. 2, a side elevation of same with one wheel removed; and Fig. 3, a detached view of one of the standards, illustrating the slotted end thereof.

My invention relates to that class of machines which are adapted exclusively for digging potatoes and other tuberous roots, and has for its object to facilitate the movement and adjustment of the shovel and the separation of the potatoes from the dirt and the vines adhering and clinging thereto. This object is attained in my invention by mounting, in manner as hereinafter described, the shovel upon adjustable bars dependent from and carried by the axle of a pair of wheels of large diameter, and by gearing the clearing-fingers, revolving in the customary manner at the rear end of the shovel, by chain gearing and sprocket-wheels, to a rotating shaft coupled by cog-gearing to the axle; and, furthermore, by adding to the machine a set of revolving feeding-fingers geared in like manner to the axle, adapted to engage the vines and weeds lifted by the shovel and sweep them back over the plow as it moves forward, so as to clear the same and prevent all clogging or dragging of the machine as it advances.

In the accompanying drawings, A represents the axle, and B B the wheels, of large diameter, upon which the machine is mounted. The wheels B B are keyed to the axle A, so that the axle shall rotate with the wheels, whose large diameter affords great power in producing this rotation.

C C are two standards, to which the tongue D of the machine is secured by means of a fork, E E, and through which the axle A is carried transversely, so as to rotate in suitable journal-boxes formed or fitted therein.

A shaft, F, is journaled in the upper ends of the two standards C C, parallel with the axle, to which it is geared by means of a large toothed wheel, G, keyed to the axle, meshing with a pinion, H, keyed to the shaft, so that the latter shall be driven by the rotation of the first at a much higher speed.

The lower ends of the standards C C, projecting below the axle, are slotted (see Fig. 3) transversely to the length of the axle, and within these slots are fitted the longitudinal draft-bars I I. The front ends of these draft-bars are bent inward until they meet centrally upon an interposed block, J, to which they are bolted, and a clevis, K, is fitted to said block to admit of the attachment of a whiffletree thereto.

The connection of the draft-bars with the standards C C is made by means of bolts L L passing transversely through the bars and projecting through extended slots in the standards, so as to admit of longitudinal play therein.

The rear ends of the draft-bars I I are bent downward (see Fig. 2) and bolted each to one of two side plates, M M, whose upper edges are inclined at a suitable angle to receive the shovel N, which, extending across from plate to plate, is riveted to and upon said upper edges.

The handles O O of the machine are secured, respectively, at their front or inner ends by bolts or by clips to the draft-bars, immediately in the rear of the axle, and extending rearwardly are supported at a suitable angle of inclination by means of brace-bars P P, made fast at their lower ends to the side plates, M M, which support the shovel, and whose upper ends are secured to the handles by means of bolts Q Q. A series of bolt-holes are pierced in the upper ends of the brace-bars P P, (see Fig. 1,) to receive the bolts Q Q, and permit of an adjustment of the angle of inclination of the handles O O by a change of the bolts from one hole to another.

The rear ends of the side plates, M M, are made to project far enough beyond the rear top edge of the shovel N to serve as bearings for the rotating shaft R, carrying the clearing-teeth S, and which is mounted about on a level with said top edge.

The clearing-teeth are of the usual curved form, as shown in Fig. 2 of the drawings, and are made fast to the shaft R, so as to revolve with it in close proximity to the rear end of the shovel.

The two ends of the shaft R project beyond the side plates, M M, and are each fitted with a small sprocket-wheel, T, in line with a larger sprocket-wheel, T', fitted upon the ends of the shaft F, projecting for the purpose beyond the standards C C. The wheels T and T' are geared by a chain, U, so that the rotation of the shaft F is made to cause a revolution of the clearing-teeth S S at an increased velocity, determined by the difference in the diameter of the wheels T and T'.

An additional shaft, W, is mounted over the shovel N, parallel with the clearing-shaft R, in arms Y Y, depending vertically from the handles O O, and which are made adjustable by means of a series of bolt-holes in their upper ends to receive the bolts $a$, by which they are made fast to the handles.

The height of the shaft W is so adjusted as that a series of radial fingers, W' W', upon the shaft will clear the face of the shovel by an interval of four or five inches, (more or less,) so that they will engage the vines and weeds which may be accumulated thereon without becoming entangled therewith.

The shaft W is geared to the shaft F, so as to rotate in a direction opposite to that of the clearing-teeth S S, by means of sprocket-wheels V V in the ends of the shaft W, which are arranged to be engaged by the chain U, which drives the shaft carrying said clearing-teeth, in manner as illustrated in Fig. 2 of the drawings.

In the operation of the machine the potatoes dug up by the forward movement of the shovel N as it is drawn by the traction of the team hitched to the draft-bars I I, by means of a whiffletree hooked in the clevis K, are carried backward up over the top edge of the shovel, and, with the dirt attached thereto, drop upon the clearing-teeth S S, revolving at the rear of the shovel. The dirt carried up with the potatoes drops from them between the teeth S S, being detached and separated therefrom by their revolution, and the potatoes drop clear and clean at the rear of the machine. The teeth S S are made to revolve during the movement of the machine by means of the chain U, sprocket-wheels T T', and gear-wheels G H, the gearing being so adjusted as that the comparatively slow rotation of the axle will operate to produce a very rapid revolution of the teeth.

By the operation of the revolving feeding-teeth W' in unison with the clearing-teeth S S the shovel is kept clear of weeds, vines, &c., so that it will never become clogged.

I claim as my invention—

1. The combination, in a potato-digging machine, with the axle A, wheels B B, and tongue D, of the slotted standards C C, mounted upon said axle, the draft-bars I I, playing in slots in said standard, the shovel N and handles O O, secured to said draft-bars, the adjustable brace-bars P P, connecting the rear end of the shovel to the handles, the rotating-shaft R, carrying the clearing-teeth S S at the rear end of the shovel, and the sprocket-wheels T T, chain U, shaft F, pinion H, and toothed wheel G, by which the shaft R is geared to the axle A, all substantially in the manner and for the purpose herein set forth.

2. The combination, with the rotating axle A and shovel N of a potato-digger, and with the shaft R and clearing-teeth S S, mounted at the rear end of the shovel and geared, substantially as described, to the axle A, of an auxiliary shaft, W, and radial teeth W', mounted above the shovel, and geared, substantially as described, to said shaft R, to revolve in unison therewith, substantially in the manner and for the purpose herein set forth.

In testimony whereof I have signed my name to this specification in the presence of two subscribing witnesses.

PETER J. HELLER.

Witnesses:
F. L. HELLER,
THOS. TRUESDELL.